United States Patent

Bosisio et al.

Patent Number: 5,185,841
Date of Patent: Feb. 9, 1993

[54] OPTICAL FIBRE ELEMENT COMPRISING AN OPTICAL FIBRE HOUSING CONSTITUTED BY A POLYOLEFIN MATERIAL, AND AN H2-ABSORBING BUFFER

[75] Inventors: Claudio Bosisio, Brembate Sotto; Antonio Campana, Milan, both of Italy

[73] Assignee: Pirelli Cavi S.p.A., Milan, Italy

[21] Appl. No.: 789,295

[22] Filed: Nov. 8, 1991

[30] Foreign Application Priority Data

Nov. 29, 1990 [IT] Italy .............................. 22236 A/90

[51] Int. Cl.⁵ .............................................. G02B 6/44
[52] U.S. Cl. ..................................... 385/100; 524/291
[58] Field of Search ............... 385/100; 524/291, 343, 524/93

[56] References Cited

U.S. PATENT DOCUMENTS

| | | | |
|---|---|---|---|
| 4,238,575 | 12/1980 | Kleiner et al. | 524/303 X |
| 4,590,231 | 5/1986 | Seltzer et al. | 524/291 X |
| 4,703,073 | 10/1987 | Winter et al. | 524/291 X |
| 4,824,883 | 4/1989 | Walters | 524/93 |
| 4,876,300 | 10/1989 | Seltzer et al. | 524/291 X |

FOREIGN PATENT DOCUMENTS

| | | |
|---|---|---|
| 0200914 | 12/1986 | European Pat. Off. |
| 0250076 | 12/1987 | European Pat. Off. |
| 280279 | 2/1988 | European Pat. Off. |
| 0287244 | 10/1988 | European Pat. Off. |
| 3210859 | 9/1983 | Fed. Rep. of Germany |
| 2200535 | 4/1974 | France |
| 1448793 | 9/1976 | United Kingdom |
| 2021282 | 11/1979 | United Kingdom |
| 1598540 | 9/1981 | United Kingdom |
| 2099173 | 12/1982 | United Kingdom |
| 2164471 | 8/1985 | United Kingdom |
| 2170921 | 10/1985 | United Kingdom |
| 2174822 | 2/1986 | United Kingdom |
| 2172410 | 12/1986 | United Kingdom |

*Primary Examiner*—Akm E. Ullah
*Attorney, Agent, or Firm*—Brooks Haidt Haffner & Delahunty

[57] ABSTRACT

The optical fibre element comprises at least one optical fibre housing constituted by a polyolefin material having at least one additive which protects it against degradation due to oxidation, heat or the proximity of metals, and (b) at least one $H_2$-absorbing buffer. The additive is selected from the group comprising anti-oxidants, stabilizers and metal deactivators which cause a reduction in the hydrogen absorption capacity of less than 30% in the, or each, $H_2$-absorbing buffer when the, or each, buffer has been in contact with said polyolefin containing the, or each, additive for 30 days at 100° C. in an air atmosphere saturated with water vapor at 150 mbar.

6 Claims, 2 Drawing Sheets

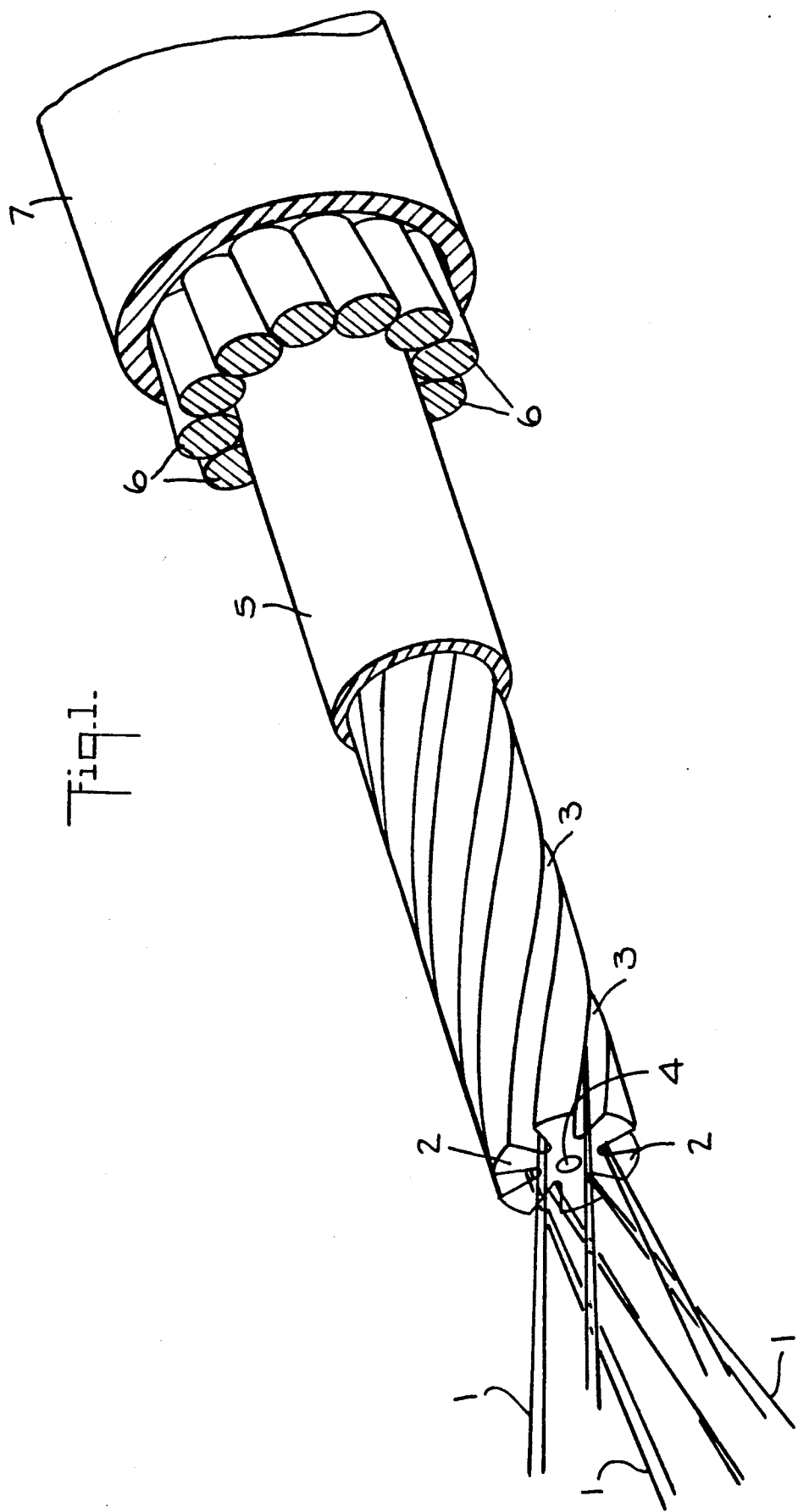

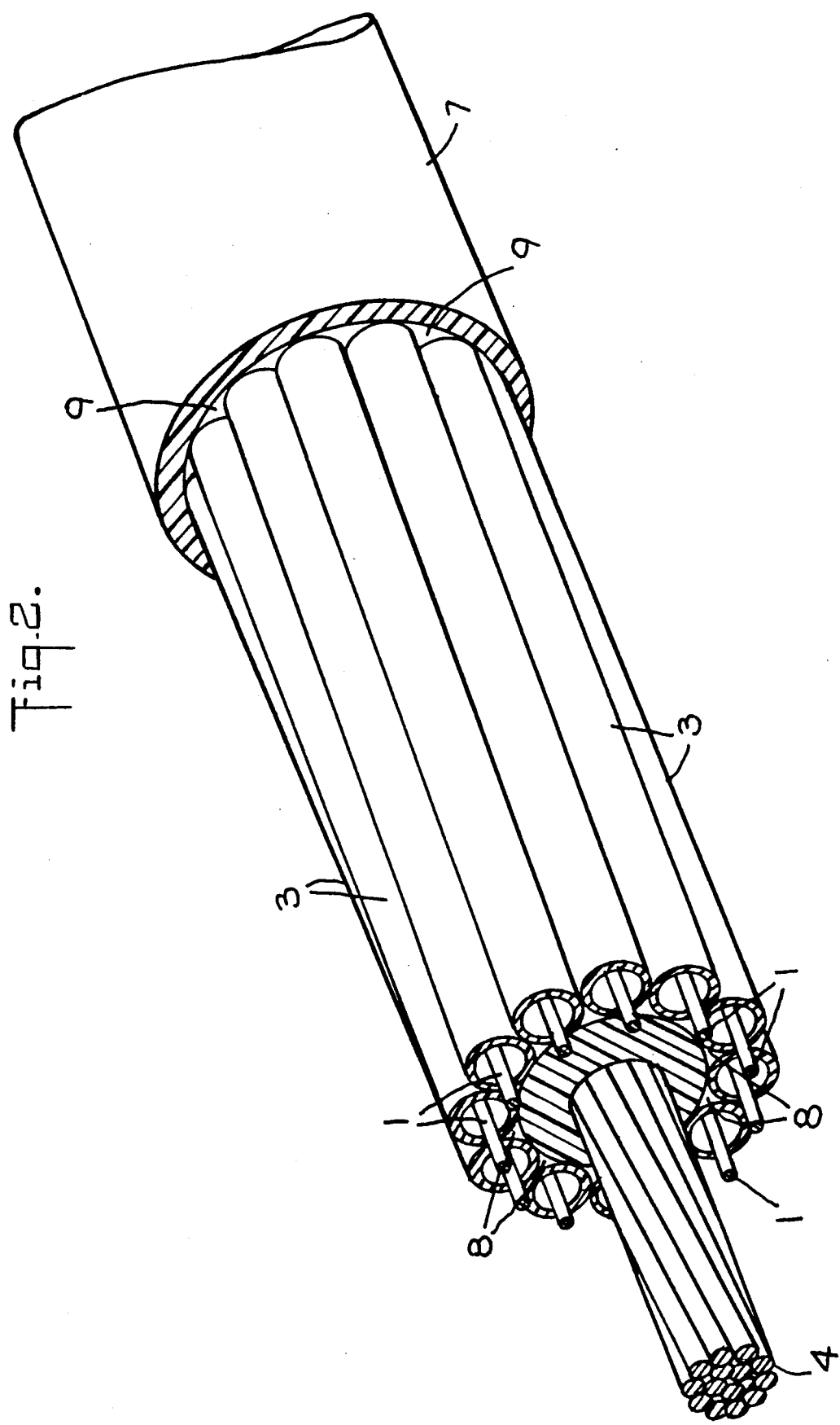

OPTICAL FIBRE ELEMENT COMPRISING AN OPTICAL FIBRE HOUSING CONSTITUTED BY A POLYOLEFIN MATERIAL, AND AN H2-ABSORBING BUFFER

RELATED APPLICATION

This application pertains to subject matter related to the subject matter of co-pending application Ser. No. 07/783,280 filed Oct. 28, 1991 now pending and entitled "Optical Fibre Element Comprising a Polyacrylate Coating Layer Reticulated by UV Radiation and an $H_2$-Absorbing Buffer".

FIELD OF THE INVENTION

The present invention relates to an optical fibre element which comprises a housing for optical fibres, constituted by polyolefin material comprising at least one additive which protects it against degradation, and an $H_2$-absorbing buffer.

In this specification, the expression "optical fibre element" is used to indicate elements for the transmission and/or processing of optical signals such as, for example, optical fibre cables, joints for optical fibre cables, terminals for optical fibre cables, amplifiers with active core optical fibres, optoelectronic repeaters, optical fibre sensors and such like.

BACKGROUND OF THE INVENTION

It is known that, to enable them to be handled, optical fibres are covered by a protective sheath. In the production of optical fibre elements, such as for example, cables, the optical fibres coated with said protective sheath are placed in appropriate housings which are generally constituted by polyolefin material.

Examples of such housings are loose sleeves described in U.S. Pat. Nos. 4,143,942, 4,153,332, 4,676,590, 4,688,889, and UK-1.598.540 and grooved cores described in U.S. Pat. Nos. 4,199,224, 4,491,386, 4,668,889, 4,690,498; EP-A-280.279; UK-1.448.793, 2.021.282, 2.099.173, 2.164.471, 2.170.921, 2.172.410, 2.174.822, and FR-2.200.535.

It is also known that in optical fibre elements other structures of polyolefin material can be present.

It is further known that hydrogen exerts harmful effects on optical fibres and jeopardizes their efficiency. It has, therefore, been proposed to incorporate, in optical fibre elements, some compositions capable of absorbing hydrogen before it exerts its harmful effects on the fibres. In this specification, such compositions are, for brevity, referred to by the expression "$H_2$-absorbing buffers".

The applicants or their assignee, have developed $H_2$-absorbing buffers substantially consisting of compositions comprising at least one unsaturated organic compound of silicon and at least one hydrogenation catalyst selected from the group comprising the salts and the organic and inorganic compounds of the transition metals.

Examples of these compositions are described in U.S. Pat. No. 4,688,889 and in the U.S. patent application Ser. Nos. 07/723,441 and 07/722,085, both filed Jun. 27, 1991.

It has now been observed unexpectedly some polyolefin materials poison the hydrogenation catalyst, which is based on transition metals, of the $H_2$-absorbing buffers.

Studies carried out with the object of identifying the cause of such poisoning have shown that this must be looked for in some additives added to protect the polyolefin against degradation due to oxidation (anti-oxidants) and/or heat (stabilizers) and/or the proximate metals (metal deactivators), in spite of the fact that, usually, the quantity of such additives is only of the order of $2.5 \times 10^{-2}$ to $5 \times 10^{-2}$ parts by weight with respect to the quantity of $H_2$-absorbing buffer in contact with the polyolefin material.

The additives which inactivate the $H_2$-absorbing buffer are identified by means of a test, described in detail later, with which it is possible to measure the quantity of hydrogen absorbed by a $H_2$-absorbing buffer before and after it has been placed in contact with a polyolefin, protected against oxidation and/or heat degradation, for 30 days at 100° C. in an air atmosphere saturated with water vapour at 150 mbar.

BRIEF DESCRIPTION OF THE INVENTION

On the basis of the experience acquired, it has been established that the additives can be considered non-inactivating when the capacity of residual absorption of the $H_2$-absorbing buffer, which has been in contact with the polyolefin which contains them for 30 days at 100° C. in an air atmosphere saturated with water vapour at 150 mbar, is greater than 70%.

In one embodiment, the present invention relates to an optical fibre element comprising (a) at least one optical fibre housing, constituted by a polyolefin material having at least one additive which protects it against degradation due to oxidation, heat or the proximity of metals, and (b) at least one $H_2$-absorbing buffer, said element being characterized in that the, or each, said additive is selected from the group comprising anti-oxidants, stabilizers and metal deactivators and causes a reduction in the hydrogen absorption capacity of less than 30% in the, or each, said $H_2$-absorbing buffer when the or each said buffer has been in contact with said polyolefin containing the, or each, said additive for 30 days at 100° C. in an air atmosphere saturated with water vapour at 150 mbar.

In a further embodiment, the present invention relates to an optical fibre cable comprising (a) at least one optical fibre housing constituted by a polyolefin material having at least one additive which protects it against degradation due to oxidation, heat or the proximity of metals, and (b) at least one $H_2$-absorbing buffer, said cable being characterized in that the, or each, said additive is selected from the group comprising anti-oxidants, stabilizers and metal deactivators and causes a reduction in the hydrogen absorption capacity of less than 30% in the, or each, said $H_2$-absorbing buffer the, or each, said buffer when has been in contact with said polyolefin containing the, or each, said additive for 30 days at 100° C. in an air atmosphere saturated with water vapour at 150 mbar.

A typical example of a $H_2$-absorbing buffer is described in example 1 of the U.S. Pat. No. 4,688,889; said $H_2$-absorbing buffer is substantially constituted by (a) 90 parts by weight of a vinyl-terminated polydimethylsiloxane, with no chain unsaturations and having a content of unsaturated groups equal to 7.4 mmol per 100 g of product, b) 0.2 parts by weight of palladium powder having an average size 48 microns and (c) 10 parts by weight of colloidal silica.

Examples of optical cables and of components thereof in the production of which it is useful to employ the present invention are those described in the following documents: U.S. Pat. No. 4,688,889, UK-A-2.172.410, EP-A-280.275, FR-A-2.200.535, UK-A-1.598.540, UK-A-2.021.282, UK-A-2.099.173, UK-A-2.164.471, UK-A-2.170.921, UK-A-2.174.822, U.S. Pat. No. 4,143,942, U.S. Pat. No. 4,153,332, U.S. Pat. No. 4,199,224, U.S. Pat. No. 4,491,386, U.S. Pat. No. 4,491,387, U.S. Pat. No. 4,676,590 and U.S. Pat. No. 4,690,498.

BRIEF DESCRIPTION OF THE DRAWINGS

The use of the barrier composition of the invention in connection with optical fiber cables of the type shown in U.S. Pat. Nos. 4,688,889 and 4,725,123 is illustrated in the accompanying drawings in which:

FIG. 1 is a perspective view of an optical fiber cable of the type shown and described in U.S. Pat. No. 4,688,889 and including the barrier composition of the invention; and FIG. 2 is a perspective view of an optical fiber cable of the type shown and described in U.S. Pat. No. 4,725,123 and including the barrier composition of the invention.

DESCRIPTION OF EMBODIMENTS OF THE INVENTION

The cables shown in FIGS. 1 and 2 are merely an example of optical fiber cables with which the barrier mixture of the invention may be used since it will be apparent to those skilled in the art that the barrier mixture may be incorporated in optical fiber cables of different types.

As shown in FIGS. 1 and 2, the optical fiber cables comprise suitable seats 3 for housing optical fibers 1. The said seats 3 may be helical grooves (FIG. 1) made in a core 2 made of plastic material or small plastic tubes (FIG. 2). The seats 3 are associated with sheaths 5 and 7 preferably made of plastic material as well as with elements 4 and 6 resistant to traction on the cable.

As known to the person skilled in the art, the elements resistant to the traction are axially and/or peripherally located depending on the expected use of the cable and the manufacturing technology.

The element 4 in FIGS. 1 and 2 may be made of fiber rinforced resin or metal wire or wires, while the elements 6 in FIG. 1 may be high strength fibers, such as aramidic fibers, or metal wires.

In FIG. 1, the slots or grooves 3 housing the optical fibers 1 are filled with the barrier mixture of the invention.

In FIG. 2, the barrier mixture fills the small plastic tubes 3 housing the optical fibers and/or the inner recesses 8 and/or the outer recesses 9 surrounding the small plastic tubes 3. Thus, the small plastic tubes 3 in FIG. 2 can be filled and/or surrounded by the barrier mixture of the invention.

Examples of suitable antioxidants and stabilizers according to the present invention are those which do not contain any atoms of nitrogen, phosphorus or sulphur in their molecule.

Typical examples of additives suitable for accomplishing the present invention are:

pentaerythritol-tetrakis-[3-(3',5'-di-tert.butyl-4'-hydroxyphenyl)-propionate] (IRGANOX 1010 by Ciba Geigy), octadecyl-3-(3',5'-di-tert.butyl-4'-hydroxyphenyl)-propionate (IRGANOX 1076 by Ciba Geigy), 2,2'-methylene-bis-(4,6-dimethylphenol) (PERMANAX 28 HV by Rhône-Poulenc), 2,2'-methylene-bis-(4-methyl-6-tert.butyl-phenol) (ANTIOXIDANT 2246 by Bayer), 2,2'-methylene-bis-(4-ethyl-6-tert.butylphenol) (ANTIOXIDANT 425 by Cyanamid), 1,6-hexanediol-bis-[3-(3',5'-di-tert.butyl-4-hydroxyphenyl) propionate] (IRGANOX 259 by Ciba Geigy), and triethyleneglycol-bis-[3-(3-tert.butyl-4-hydroxy-5-methyl-phenyl)-propionate] (IRGANOX 245 by Ciba Geigy).

The following tests and examples are used to illustrate the present invention without, however, limiting it in any way.

TESTS

The capacity of absorbing hydrogen on the part of $H_2$-absorbing buffers was assessed by measuring the pressure drop in a hermetically-sealed container, containing the $H_2$-absorbing buffer under examination in a hydrogen atmosphere. The apparatus used is an automatic commercial apparatus for the measurement of pressure in the range from 1000 to 1 mbar.

The apparatus is formed by assembling a fixed-volume chamber provided with two valves (one of which is of the pin-type to regulate the flow of hydrogen and the other of the usual type for connection to a vacuum pump), with a commercial pressure transducer type E 8510 connected to a commercial digital reader type EMV251, both made by the firm, Edwards Alto Vuoto S.p.A. Inside the apparatus there is a glass container.

The control unit providing a digital reading of the pressure has a resolution of 1 mbar, and the indication of pressure is independent of the composition of the gas and of atmospheric pressure.

The tests have been carried out at a constant temperature of 23° C. After weighing the glass container to an accuracy of 0.01 g (weight A), the $H_2$-absorbing buffer under examination was placed in the container; the glass container was then weighed a second time (weight B).

The glass container containing the $H_2$-absorbing buffer under examination was inserted into the apparatus and vacuum was applied for about 1 to 2 hours.

After leaving the system in a static vacuum for at least 12 hours, the container was connected to a hydrogen cylinder until the digital pressure indicator indicated a desired pressure (generally some 500 or 1000 mbar).

The hydrogen cylinder cock was closed, and the time and the hydrogen pressure were noted. After 24 hours the residual hydrogen pressure was read.

The hydrogen absorption capacity expressed in normal $cm^3/g$ was calculated with the following formula:

$$\frac{(P - Pr) \times V \times 273}{1013 \times (273 + C) \times (B - A)}$$

where P=initial hydrogen pressure, Pr=residual hydrogen pressure after 24 hours of test, C=temperature, in °C., during the test, V=free volume of the apparatus after insertion of the $H_2$-absorbing buffer under examination, B=weight of the glass container with the $H_2$-absorbing buffer, A=weight of the empty glass container. For each sample of $H_2$-absorbing buffer, the above test was carried out twice, and the average of the two values obtained was made.

The above test was carried out on H$_2$-absorbing buffers before and after having been in contact with samples of loose sleeve, grooved cores or stamped plates of polyolefin material comprising at least one additive which protects it against degradation.

Said samples were smeared with a quantity of H$_2$-absorbing buffer in the same ratio as used on average in an optical cable. More in particular, 3 g of H$_2$-absorbing buffer were smeared on each linear meter of loose sleeve or of grooved core. The same quantity was also smeared on two types of small plates having a surface area of 200 cm$^2$ and weighing 10 g and 5 g, respectively.

Each sample treated in this way was aged at 100° C. in a large sealed test tube in the presence of air (150 mbar) and saturated water vapour.

After one month, the H$_2$-absorbing buffer was recovered, and its residual hydrogen absorption capacity was measured with the method described above.

Unless otherwise indicated, the values given in relation to the compositions described in the following examples refer to parts by weight.

EXAMPLE 1

Two meters of grooved core constituted by a material having the following composition:

| | |
|---|---|
| polypropylene | 100 |
| calcium stearate | 0.05 |
| pentaerythritol-tetrakis-[3-(3',5'-di-tert.butyl-4'-hydroxyphenyl)-propionate] (IRGANOXTM 1010 by Ciba Geigy) | 0.10 |
| distearyl-thio-dipropionate (IRGANOXTM PS 802 by Ciba Geigy) | 0.20 |
| hydrazide of 3,5-di-tert.butyl-hydroxy-benzyl)-propionic acid (IRGANOXTM MD 1024 by Ciba Geigy) | 0.20 |
| tris-(2,4-di-tert.butylphenyl)-phosphite (IRGAFOXTM 168 by Ciba Geigy) | 0.05 | were spread with 6 g of an H$_2$-absorbing buffer having an initial hydrogen absorption capacity of 1.9 normal cm$^3$/g.

After aging, the residual hydrogen absorption capacity was 0 normal cm$^3$/g.

The material of this example can thus be classified as highly poisonous.

EXAMPLE 2

Two meters of grooved core constituted by a material having the following composition:

| | |
|---|---|
| polypropylene | 100 |
| calcium stearate | 0.05 |
| pentaerythritol-tetrakis-[3-(3',5'-di-tert.butyl-4'-hydroxyphenyl)-propionate] (IRGANOXTM 1010 by Ciba Geigy) | 0.30 |
| hydrazide of 3,5-di-tert.butyl-hydroxy-benzyl)-propionic acid (IRGANOXTM MD 1024 by Ciba Geigy) | 0.20 |
| tris-(2,4-di-tert.butylphenyl-phosphite (IRGAFOXTM 168 by Ciba Geigy) | 0.05 | were spread with 6 g of an H$_2$-absorbing buffer having an initial hydrogen absorption capacity of 1.9 normal cm$^3$/g.

After aging, the residual hydrogen absorption capacity was 0.3 normal cm$^3$/g.

The material of this example is thus slightly better than that of example 1 but it is still highly poisonous.

EXAMPLE 3

Two meters of grooved core constituted by a material having the following composition:

| | |
|---|---|
| polypropylene | 100 |
| calcium stearate | 0.05 |
| pentaerythritol-tetrakis-[3-(3',5'-di-tert.butyl-4'-hydroxyphenyl)-propionate] (IRGANOXTM 1010 by Ciba Geigy) | 0.50 |
| hydrazide of 3,5-di-tert.butyl-hydroxy-benzyl)-propionic acid (IRGANOXTM MD 1024 by Ciba Geigy) | 0.20 |
| tris-(2,4-di-tert.butyl-phenyl)-phosphite (IRGAFOXTM 168 by Ciba Geigy) | 0.05 | were spread with 6 g of an H$_2$-absorbing buffer having an initial hydrogen absorption capacity of 1.9 normal cm$^3$/g.

After aging, the residual hydrogen absorption capacity was 1.3 normal cm$^3$/g.

In spite of a distinct improvement over the material of Examples 1 and 2, the material of this example is still moderately poisonous.

EXAMPLE 4

Two meters of grooved nucleus constituted by material having the following composition:

| | |
|---|---|
| polypropylene | 100 |
| calcium stearate | 0.05 |
| pentaerythritol-tetrakis-[3-(3',5'-di-tert.butyl-4'-hydroxyphenyl)-propionate] (IRGANOXTM 1010 by Ciba Geigy) | 0.25 |
| octadecyl-3-(3',5'-di-tert.butyl-4'-hydroxyphenyl)-propionate (IRGANOX 1076 by Ciba Geigy) | 0.25 | were spread with 6 g of an H$_2$-absorbing buffer having an initial hydrogen absorption capacity of 1.9 normal cm$^3$/g.

After aging, the residual hydrogen absorption capacity was 1.6 normal cm$^3$/g.

The material of this example is thus not poisonous.

EXAMPLE 5

A small plate having a surface area of 200 cm$^2$ and constituted by 10 g of a material having the following composition:

| | |
|---|---|
| polypropylene | 100 |
| glycerylmonostearate | 0.05 |
| 2,2'-methylene-bis-(4-methyl-6-tert.butylphenol) Antioxidant 2246 by Bayer) | 0.25 |
| 1,6-hexanediol-bis-[3-(3',5'-di-tert.butyl-4-hydroxyphenyl)-propionate] (IRGANOX 259 by Ciba Geigy) | 0.25 | were spread with 6 g of an H$_2$-absorbing buffer having an initial hydrogen absorption capacity of 1.9 normal cm$^3$/g.

After aging, the residual hydrogen absorption capacity was 1.7 normal cm$^3$/g.

The material of this example is thus not poisonous.

We claim:

1. Optical fibre element comprising (a) at least one optical fibre housing comprising a polyolefin material having at least one additive which protects said housing against degradation due to at least one of oxidation, heat and the proximity of metals, and (b) at least one H$_2$-absorbing buffer, said element being characterized in that said additive is selected from the group consisting of anti-oxidants, stabilizers, metal deactivators and combinations thereof which causes a reduction in the hydrogen absorption capacity of less than 30% in said at least one $H_2$-absorbing buffer when said at least one buffer has been in contact with said polyolefin containing the selected said additive for 30 days at 100° C. in an air atmosphere saturated with water vapour at 150 mbar.

2. Optical fibre element according to claim 1, characterized in that the selected said additive is without any atoms of nitrogen, phosphorus or sulphur in the molecules of the additive.

3. Optical fibre element according to claim 1 or 2, characterized in that the additives are selected from
pentaerythritol-tetrakis-[3-(3',5'-di-tert.butyl-4'-hydroxyphenyl)-propionate],
octadecyl-3-(3',5'-di-tert.butyl-4'-hydroxyphenyl)-propionate,
2,2'-methylene-bis-(4,6-dimethyl-phenol)),
2,2'-methylene-bis-(4-methyl-6-tert.butylphenol),
2,2'-methylene-bis-(4-ethyl-6-tert.butylphenol),
1,6-hexanediol-bis-[3-(3',5'-di-tert.butyl-4-hydroxyphenyl)-propionate], and
triethylene glycol-bis-[3-(3-tert.butyl-4-hydroxy-5-methylphenyl)-propionate].

4. Optical fibre cable comprising at least one optical fibre housing comprising polyolefin material having at least one additive which protects said housing against degradation due to at least one of oxidation, heat and the proximity of metals, and (b) at least one $H_2$-absorbing buffer, said cable being characterized in that said additive is selected from the group consisting of anti-oxidants, stabilizers, metal deactivators and combinations thereof and which causes a reduction in the hydrogen absorption capacity of less than 30% in said at least one $H_2$-absorbing buffer when said at least one buffer has been in contact with said polyolefin containing the selected said additive for 30 days at 100° C. in an air atmosphere saturated with water vapour at 150 mbar.

5. Optical fibre cable according to claim 4, characterized in that the selected said additive is without any atoms of nitrogen, phosphorus or sulphur in the molecules of the additive.

6. Optical fibre cable according to claim 4 or 5, characterized in that the additives are selected from
pentaerythritol-tetrakis-[3-(3',5'-di-tert.butyl-4'-hydroxy-phenyl)-propionate],
octadecyl-3-(3',5'-di-tert.butyl-4'-hydroxyphenyl)-propionate,
2,2'-methylene-bis-(4,6-dimethyl-phenol)),
2,2'-methylene-bis-(4-methyl-6-tert.butylphenol),
2,2'-methylene-bis-(4-ethyl-6-tert.butylphenol),
1,6-hexanediol-bis-[3-(3',5'-di-tert.butyl-4-hydroxyphenyl)-propionate], and
triethylene glycol-bis-[3-(3-tert.butyl-4-hydroxy-5-methylphenyl)-propionate].

* * * * *

UNITED STATES PATENT AND TRADEMARK OFFICE
CERTIFICATE OF CORRECTION

PATENT NO. : 5,185,841

DATED : February 9, 1993

INVENTOR(S) : Bosisio et al

It is certified that error appears in the above-identified patent and that said Letters Patent is hereby corrected as shown below:

```
Col. 1, line 33, after "as" insert a comma (,);
       line 34, change "coated with" to --covered by--;
       line 54, after "applicants" insert a comma (,);
       line 65, insert --that-- after "unexpectedly";

Col. 2, line 39, insert commas (,,) after "the" and
                after "each";
       line 53, insert --when-- after "buffer";

Col. 4, line 22, starting at "The apparatus" should
                begin a new paragraph.
```

Signed and Sealed this

Eleventh Day of January, 1994

Attest:

BRUCE LEHMAN

*Attesting Officer*  *Commissioner of Patents and Trademarks*